(12) United States Patent
Yoshino

(10) Patent No.: US 8,503,410 B2
(45) Date of Patent: Aug. 6, 2013

(54) COMMUNICATION APPARATUS AND METHOD OF CONTROLLING SAME

(75) Inventor: Kanichi Yoshino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1212 days.

(21) Appl. No.: 11/281,815

(22) Filed: Nov. 16, 2005

(65) Prior Publication Data

US 2006/0109828 A1    May 25, 2006

(30) Foreign Application Priority Data

Nov. 19, 2004    (JP) ................ 2004-336385

(51) Int. Cl.
| | |
|---|---|
| *H04W 4/00* | (2009.01) |
| *H04L 12/28* | (2006.01) |
| *H04W 36/00* | (2009.01) |
| *H04W 24/00* | (2009.01) |
| *H04B 17/00* | (2006.01) |
| *H04B 1/38* | (2006.01) |
| *H04B 7/00* | (2006.01) |
| *H04M 1/00* | (2006.01) |

(52) U.S. Cl.
USPC ........ 370/338; 370/401; 455/444; 455/456.4; 455/424; 455/431; 455/67.11

(58) Field of Classification Search
USPC .................. 455/522; 370/318, 338, 401
See application file for complete search history.

(56) References Cited

U.S. PATENT DOCUMENTS

| | | | | |
|---|---|---|---|---|
| 5,995,838 | A | * | 11/1999 | Oda et al. ............ 455/444 |
| 6,782,266 | B2 | * | 8/2004 | Baer et al. ........... 455/456.4 |
| 6,832,093 | B1 | * | 12/2004 | Ranta ................. 455/456.4 |
| 7,149,477 | B2 | * | 12/2006 | Ogami ............... 455/67.11 |
| 7,162,235 | B1 | * | 1/2007 | Gilbert .............. 455/431 |
| 2002/0016180 | A1 | * | 2/2002 | Derosier et al. ..... 455/522 |
| 2004/0204038 | A1 | * | 10/2004 | Suzuki et al. ....... 455/553.1 |
| 2005/0101340 | A1 | * | 5/2005 | Archiable .......... 455/522 |
| 2005/0170788 | A1 | * | 8/2005 | Tanaka et al. ...... 455/73 |
| 2005/0176420 | A1 | * | 8/2005 | Graves et al. ...... 455/424 |
| 2005/0255892 | A1 | * | 11/2005 | Wong et al. ....... 455/562.1 |

FOREIGN PATENT DOCUMENTS

| | | |
|---|---|---|
| JP | 2002-366988 | 12/2002 |
| JP | 2004-282485 | 10/2004 |

* cited by examiner

*Primary Examiner* — Timothy Pham
(74) *Attorney, Agent, or Firm* — Cowan, Liebowitz & Latman, P.C.

(57) ABSTRACT

The distance to a communicating party is detected using whether or not an electromagnetic-coupled RF field formation is achieved or not as simple measurement means. If the distance to the communicating party is short, i.e., if it is possible to form an RF field, then transmission power is reduced. As a result, power consumption is reduced. Since a reduction in transmission power is accompanied by restriction of the zone in which communication is possible, leakage of information is prevented and security is enhanced.

15 Claims, 11 Drawing Sheets

COMMUNICATION APPARATUS AND METHOD OF CONTROLLING SAME

FIELD OF THE INVENTION

This invention relates to a communication apparatus for performing wireless communication using radio waves, and to a method of controlling this apparatus.

BACKGROUND OF THE INVENTION

Devices driven by batteries, such as portable information terminals typified by digital cameras, mobile telephones and PDAs (Personal Digital Assistants), have become widespread in recent years. In order to extend the time over which operation is possible using batteries, it is required that these devices consume little power.

Further, nowadays there are many occasions for automatic ticket processing using a commutation ticket constituted by an IC card or like, and admissions processing using an ID card. A wireless system that has been proposed for such occasions implements communication between the card and a gate by NFC (Near Field Communication), which is a contactless short-distance wireless scheme. In general, the distance over which an RF field (a radio-frequency electromagnetic field) is capable of being formed by short-distance radio that relies upon contactless electromagnetic coupling is on the order of tens of centimeters, and the communication speed is on the order of several hundred kilobytes per second.

Meanwhile, wireless LANs compliant with IEEE 802.11 are becoming increasingly popular for use in sending and receiving high-speed data, and novel technology such as UWB (Ultra-Wide Band) is being developed for wireless LANS of even higher speeds. In general, the communication distance of these wireless LANs is on the order of tens of meters to 100 m.

Further, an apparatus equipped for communication using a plurality of different wireless communication has been proposed in Prior Art Document 1 (the specification of Japanese Patent Application Laid-Open No. 2002-366988), by way of example. This document describes a method in which first and second communication means are provided and an emission of high-frequency power from the first communication means is halted when the second communication means has started data communication. This document also describes the provision of third communication means the transmission power of which is less than that of the first communication means, with the first and third communication means being switched between when the second communication means has started data communication. A public wireless communication scheme such as PDC (Personal Digital Cellular) or W-CDMA (Wideband-Code Division Multiple Access) is presumed as the first communication means. A wireless communication scheme that uses low-output radio waves or means other than radio waves, such as a contactless IC card, Bluetooth or IrDA (Infrared Data Association), is presumed as the second and third communication means.

In the example cited above, however, halting of or changeover from the first communication means is executed when the second communication means has started data communication. Consequently, in a case where a wireless LAN compliant with IEEE 802.11 is used as the first communication means, halting of the wireless LAN or changeover of the LAN to a wireless LAN of a different scheme is executed and the power of the first communication means cannot be controlled.

Generally, in a wireless LAN compliant with IEEE 802.11, the transmission power is fixed in conformity with the maximum conceivable communication distance. This means that is difficult to lower transmission power and reduce power consumption in cases where the communication distance is short and, hence, a low transmission power adequate. Unless battery capacity is enlarged, therefore, it is difficult to achieve long-term use.

SUMMARY OF THE INVENTION

Accordingly, an object of the present invention is to provide a communication apparatus and method of controlling same that enable a reduction in power consumption.

According to one aspect of the present invention, the foregoing object is attained by providing a wireless communication apparatus comprising:

wireless communication unit configured to perform data communication using radio waves;

detecting unit configured to detect whether a communicating party is present inside a prescribed zone using electromagnetic coupling; and control unit configured to control transmission power in the wireless communication means in accordance with result of detection by the detecting means.

According to another aspect of the present invention, the foregoing object is attained by providing a method of controlling a communication apparatus having wireless communication means for performing data communication using radio waves, comprising:

a detecting step of detecting whether a communicating party is present inside a prescribed zone using electromagnetic coupling; and a control step of controlling transmission power in the wireless communication means in accordance with result of detection at the detecting step.

According to another aspect of the present invention, the foregoing object is attained by providing a program for causing a computer to implement control of a communication apparatus having wireless communication means for performing data communication using radio waves, the program causing the computer to execute the following procedures:

a detection procedure for detecting whether a communicating party is present inside a prescribed zone using electromagnetic coupling; and a control procedure for controlling transmission power in the wireless communication means in accordance with result of detection by the detecting means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described in detail with reference to the accompanying drawings.

First Embodiment

Figure 1:
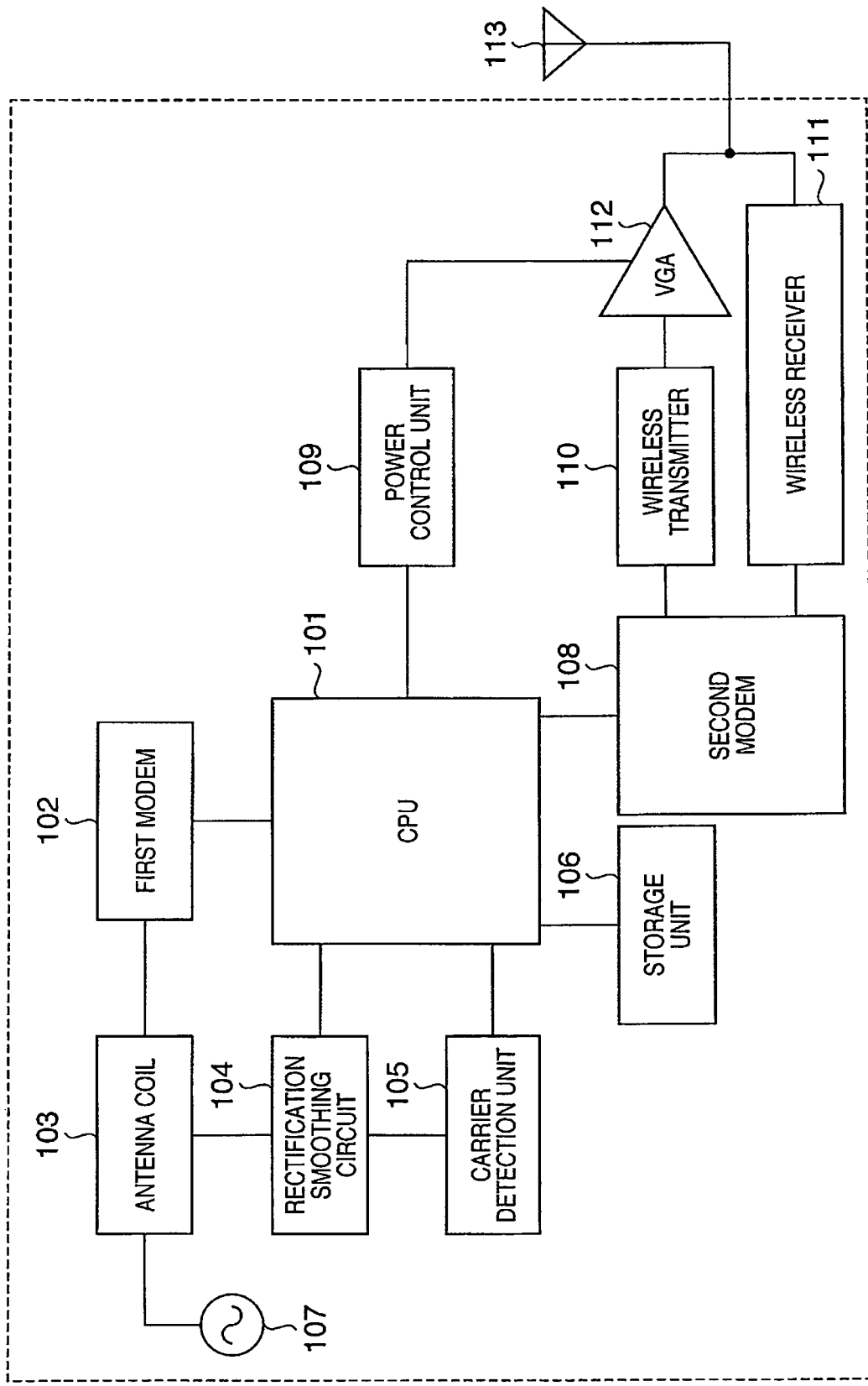
FIG. 1 is a block diagram illustrating the structure of a wireless communication apparatus according to a first embodiment of the present invention.

A first embodiment of the present invention will be described first. FIG. 1 is a block diagram illustrating the structure of a wireless communication apparatus according to the first embodiment.

The wireless communication apparatus according to the first embodiment is provided with a CPU 101 that implements overall control of the apparatus, a first modem 102 for performing wireless communication by electromagnetic coupling, and an antenna coil 103 for sending and receiving RF (radio frequency) signals by electromagnetic coupling. The apparatus is further provided with a rectification smoothing circuit 104 for rectifying and smoothing radio waves received by the antenna coil 103, a carrier detection unit 105 and a storage unit 106 for storing various setting data and transceive data, etc. The apparatus further includes an oscillator 107 that generates a carrier signal of short-distance wireless communication, a second modem 108 for modulating and demodulating transceive data, a wireless transmitter 110, a wireless receiver 111, a variable-gain amplifier (VGA) 112, a power control unit 109 for controlling the VGA 112, and an antenna 113. The storage unit 106 also stores the terminal IDs, etc., of communicating parties.

In the wireless communication apparatus thus constructed, transmit data is modulated to a prescribed format by the second modem 108, the data is then converted (up-converted) to a prescribed frequency by the wireless transmitter 110, and the resultant signal is then amplified by the VGA 112 and transmitted into space through the antenna 113. Receive data, on the other hand, is received via the antenna 113, converted to a baseband signal by the wireless receiver 111 and then demodulated by the second modem 108.

Figure 2:
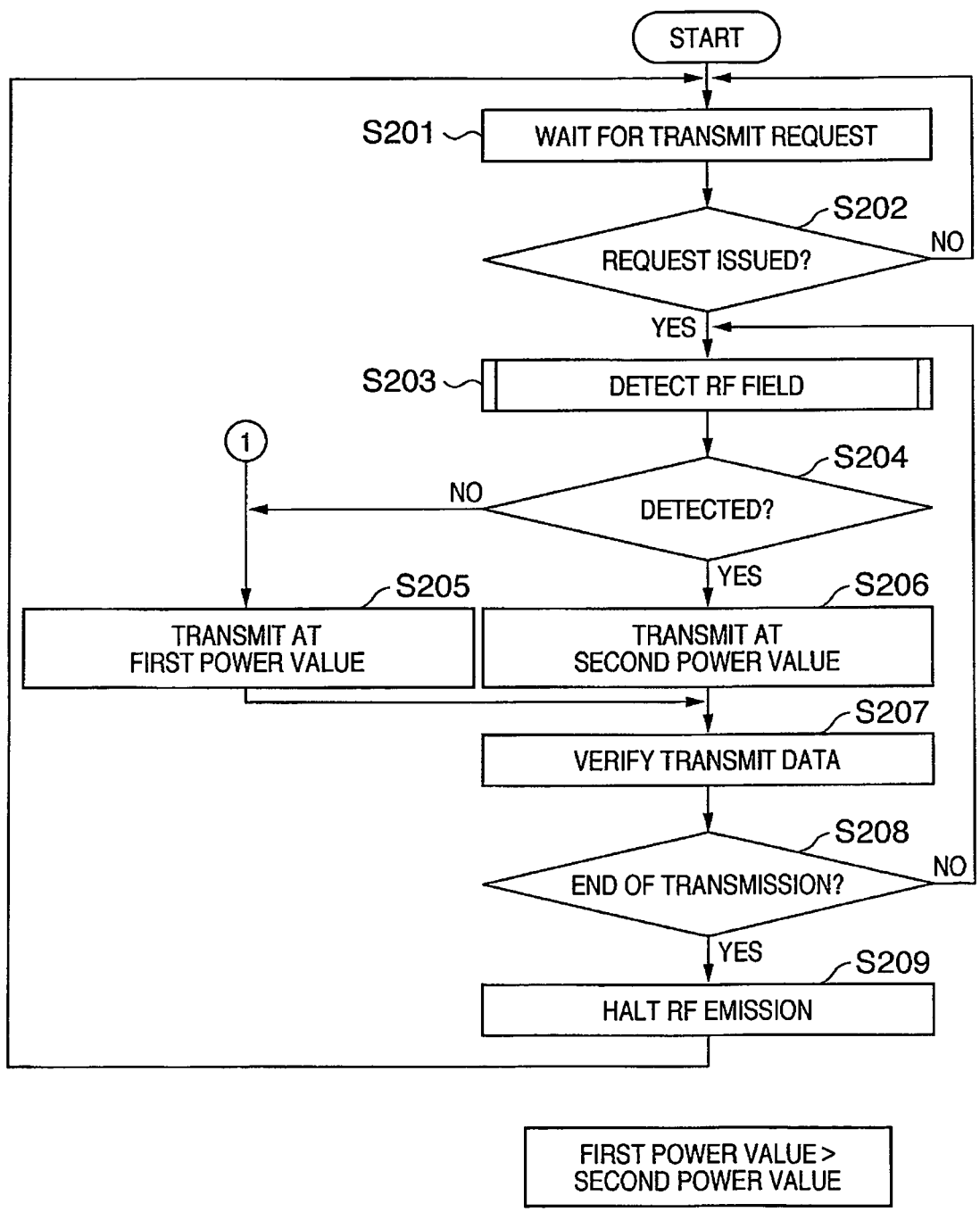
FIGS. 2 and 3 are flowcharts illustrating the operation of a terminal on a transmitting side.
Figure 3:
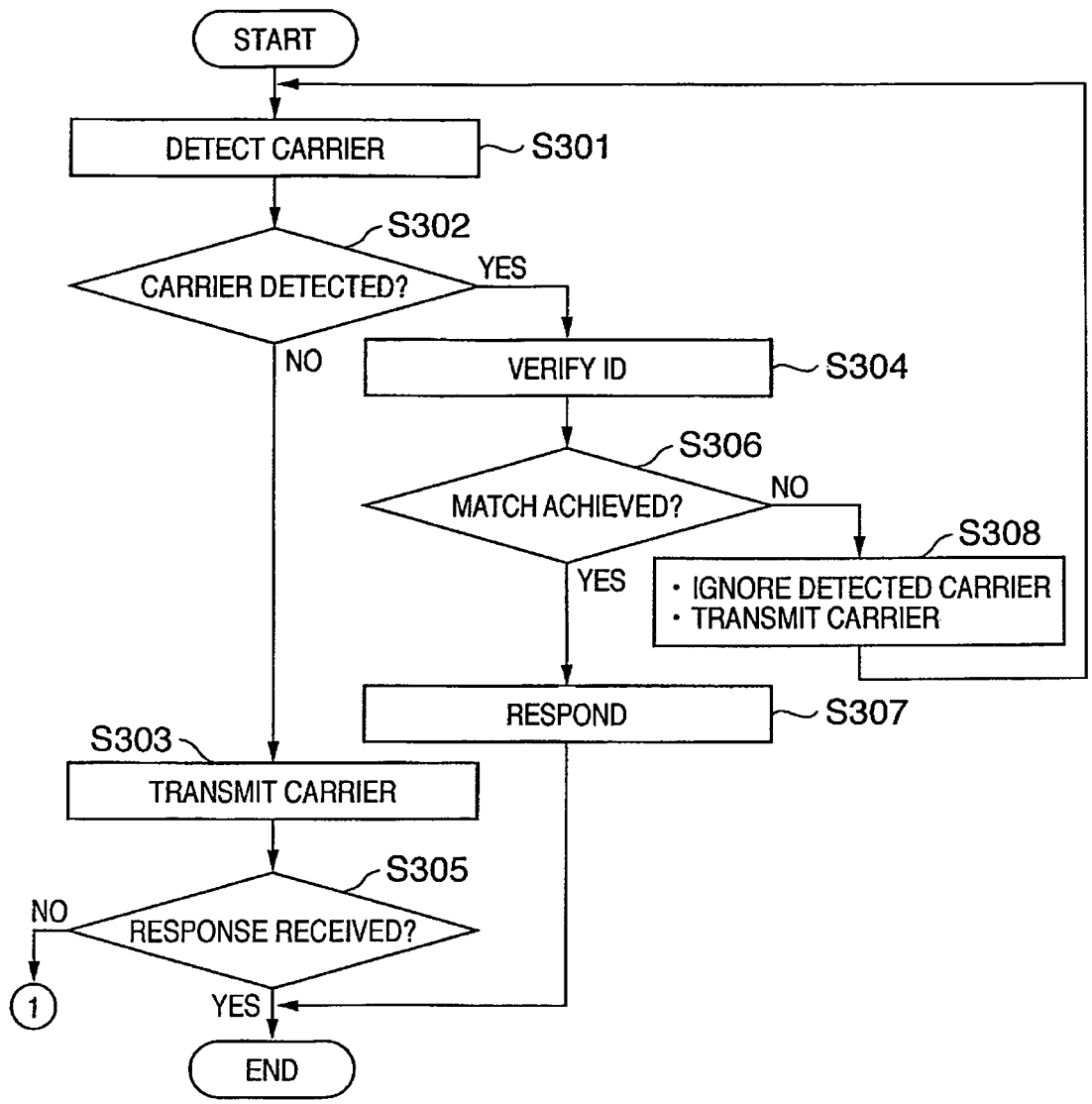

The details of operation at the time of data transmission will be described next. It will be assumed here that communication is performed between a transmit-side terminal A, which is the wireless communication apparatus of the first embodiment, and a receive-side terminal B. FIGS. 2 and 3 are flowcharts illustrating the operation of the transmit-side terminal A according to the first embodiment.

First, the terminal A is in a standby state waiting for a data transmission request (step S201) and it is determined whether transmission has been requested (step S202). If transmission has not been requested ("NO" at step S202), this decision loop is repeated.

If transmission has been requested ("YES" at step S202), then the CPU 101 performs control for detecting an RF field (step S203).

Reference will now be had to FIG. 3 to describe the details of the RF-field detecting operation executed at step S203.

The CPU 101 starts up a short-distance wireless communication section, which employs electromagnetic coupling, and detects carriers in space using the carrier detection unit 105 (step S301). The short-distance wireless communication section includes the first modem 102, antenna coil 103, rectification smoothing circuit 104, carrier detection unit 105, storage unit 106 and oscillator 107.

If a carrier is not detected ("NO" at step S302), the oscillator 107 is caused to generate a carrier, the terminal ID of the transmission destination (the terminal B on the receiving side) is placed on the transmit carrier and the result is transmitted from the antenna coil 103 (step S303). It is then determined whether the other party (the terminal B on the receiving side) has responded (step S305). If there is a response ("YES" at step S305), the operation for detecting the RF field is terminated. On the other hand, if there is no response from the other party ("NO" at step S305), then the CPU 101 instructs the power control unit 109 to set the transmission power value of the VGA 112 to a first power value and starts a transmitting operation (step S205).

Further, if the above-mentioned carrier has been detected ("YES" at step S302), the first modem 102 is caused to demodulate the ID data on the carrier and it is determined whether this is a carrier from the transmission destination (the terminal B on the receiving side) (step S304). It is then determined whether this ID is the address of the local apparatus (terminal A on the transmitting side) (step S306).

If the result of these determinations is that the detected carrier is from the transmission destination (receive-side terminal B) and that it is the address of the local apparatus (transmit-side terminal A) ("YES" at step S306), then the detected carrier is load-modulated and a response made (step S307).

As a result, even if the short-distance wireless communication unit of the transmission destination (receive-side terminal B) is transmitting radio waves as an initiator, it is also possible to verify that the transmission destination lies within the zone in which RF-field formation is possible.

On the other hand, if the detected carrier is not one from the transmission destination (receive-side terminal B) or is one from the transmission destination (receive-side terminal B) but is not one intended for the local apparatus (transmit-side terminal A) ("NO" at step S306), then control proceeds to step S308. Here the detected carrier is ignored and the ID carrier of the receive-side terminal B is placed on a carrier and transmitted using the time during which a carrier is not being issued.

The following cases can be mentioned as those where a detected carrier does not contain the ID of the local apparatus: A case where short-distance wireless communication that is not related to the local apparatus is being performed within the zone in which RF-field formation is possible, and a case where a terminal that is not related to the local apparatus is searching for a terminal that is not the local apparatus.

Figure 4:
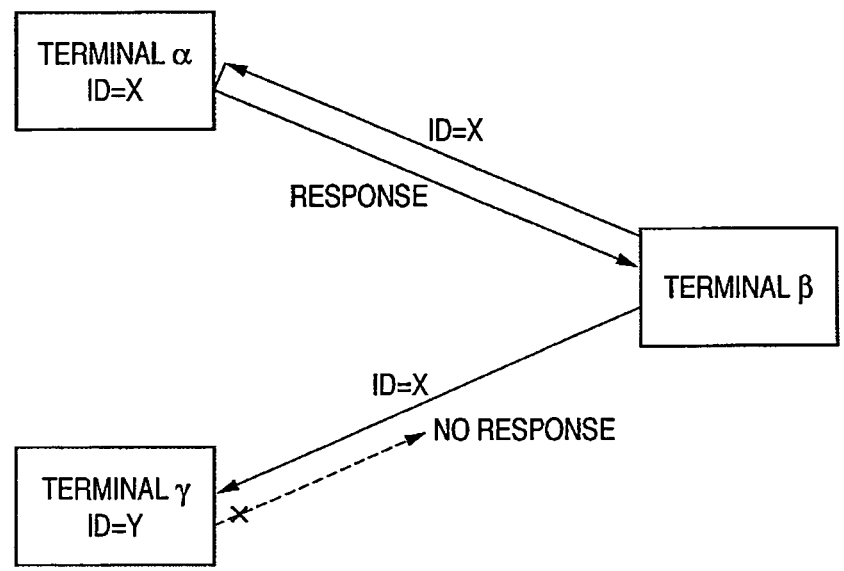
FIG. 4 is a diagram illustrating a method verifying an ID.

Further, the following case can be mentioned as a case where a carrier is one from the transmission destination but is not one intended for the local apparatus: With a short-distance wireless scheme, received radio waves are load-modulated and a response made to the transmission destination in a case where a terminal having the pertinent ID lies within the zone in which RF-field formation is possible, as shown in FIG. 4. In the example shown in FIG. 4, assume that terminals α, β and γ are present within the zone in which RF-field formation is possible and that terminal β is attempting to verify the existence of terminal α. In such case the terminal β places the identifier (ID=X) of terminal α on the transmit carrier and releases the carrier into space. Terminal α modulates the received radio waves and sends a response back to terminal β. As a result, whether the terminal that is the transmission destination relative to terminal β, namely terminal α in this example, is verified.

Meanwhile, terminal γ also receives the radio waves from terminal β and becomes capable of forming an RF field. Since the received ID is different, however, terminal γ does not send a response back to terminal β. In this example, terminal γ receives the carrier from the transmitting party but the carrier is not intended for this terminal.

Thus, detection of the RF field is executed at step S203. If the result of detection is that the terminal that is the transmission destination (receive-side terminal B) does not reside within the zone in which RF-field formation is possible ("NO" at step S204), then this corresponds to the case where there is no response at step S305 mentioned above. Accordingly, the CPU 101 starts the transmitting operation at the first power value (step S205). In other words, the CPU 101 instructs the power control unit 109 to set the transmission power value of the VGA 112 to the first power value and starts the transmitting operation.

On the other hand, if the result of detection is that the terminal that is the transmission destination (receive-side terminal B) resides within the zone in which RF-field formation is possible ("YES" at step S204), then the CPU 101 starts the transmitting operation at the second power value (step S206). In other words, the CPU 101 instructs the power control unit 109 to set the transmission power value of the VGA 112 to the second power value, which is smaller than the first power value, and starts the transmitting operation. As a result, if the transmission destination (receive-side terminal B) is present within the zone in which RF-field formation is possible, communication can be carried out while the transmission power of the wireless LAN is suppressed.

Next, RF-field detection is performed at regular time intervals while transmit data is present even after the start of the transmitting operation (step S207).

If transmission is subsequently completed ("YES" at step S208), the carrier transmitting operation is halted (step S209) and the apparatus waits for transmission of any ensuing data (step S201).

Reference will now be had to FIGS. 5 to 8 to describe the details of transmission power control with regard to a change in RF-field detection state during a transmitting operation.

Figure 5:
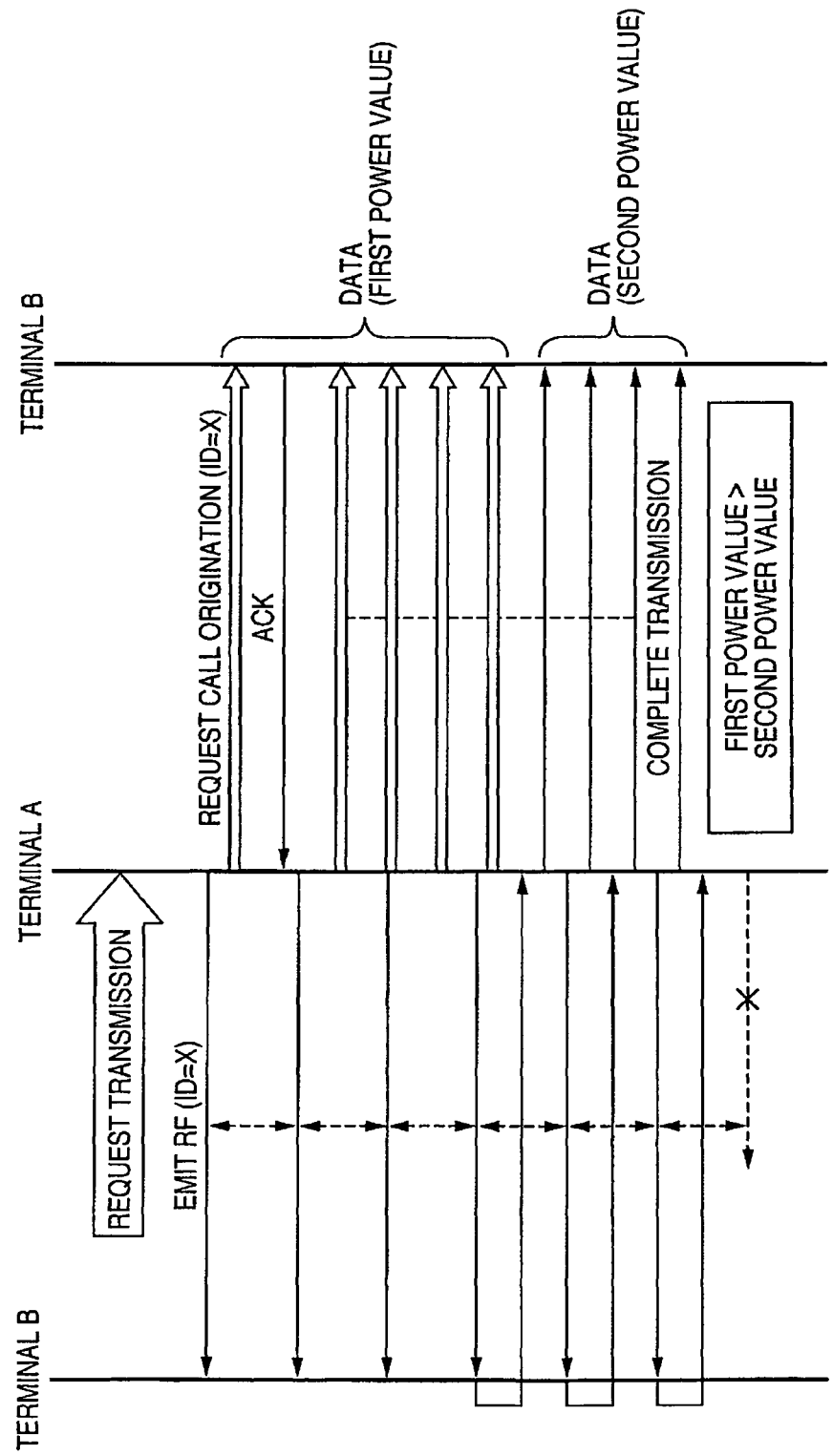
FIG. 5 is a diagram illustrating changes in state in a case where a device has moved from the outside of a zone in which an RF field is capable of being formed to the inside of this zone after the start of communication.

Described first will be transmission power control in a case where a terminal starts communicating from outside the zone in which RF-field formation is possible and then moves into the zone in which RF-field formation is possible. FIG. 5 is a diagram illustrating changes in state in such case. It is assumed that the RF field is activated from terminal A, which is the source of transmission.

If a data transmission has been requested, the transmit-side terminal A tries forming an RF field using the ID of the receive-side terminal B, which is the destination of the data transmission. In the initial state, however, the receive-side terminal B is outside the zone in which RF-field formation is possible and therefore an RF field is not formed. As a result, the transmit-side terminal A makes the transmission power value the first power value and starts the transmitting operation.

The transmit-side terminal A thenceforth tries forming an RF field at regular intervals during data transmission. If the receive-side terminal B comes to reside inside the zone in which RF-field formation is possible owing to movement of the transmit-side terminal A and/or the receive-side terminal B during communication, an RF field is formed. When the RF field is formed, the transmit-side terminal A changes the transmission power value of the ensuing data from the first power value to the second, (lower) power value and continues transmitting.

When data transmission is completed, the transmit-side terminal A terminates formation of the RF field.

Figure 6:
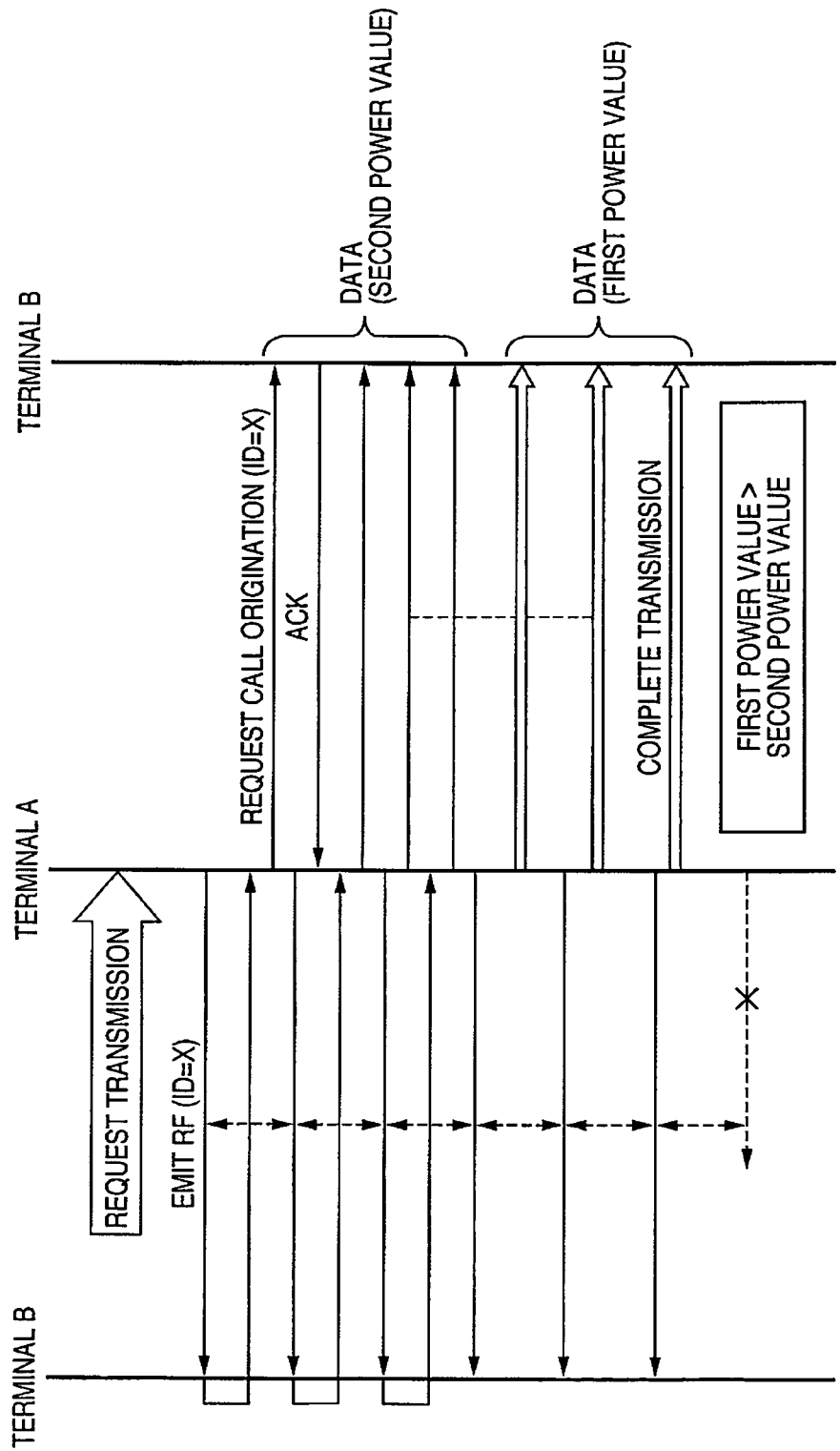
FIG. 6 is a diagram illustrating changes in state in a case where a device has moved from inside the zone in which an RF field is capable of being formed to the outside of this zone after the start of communication.

Described next will be transmission power control in a case where a terminal starts communicating from inside the zone in which RF-field formation is possible and then moves outside the zone in which RF-field formation is possible. FIG. 6 is a diagram illustrating changes in state in such case. Here also it is assumed that the RF field starts being issued from terminal A, which is the source of transmission.

If a data transmission has been requested, the transmit-side terminal A tries forming an RF field using the ID of the receive-side terminal B, which is destination of the data transmission. In the initial state in this example, the receive-side terminal B is inside the zone in which RF-field formation is possible and therefore an RF field is formed. As a result, the transmit-side terminal A makes the transmission power value the second power value and starts the transmitting operation.

The transmit-side terminal A thenceforth checks the RF field at regular intervals during data transmission. If the RF field between terminal A and the receive-side terminal B is cut off during data transmission, the transmit-side terminal A changes the transmission power value of the ensuing data from the second power value to the first (higher) power value and continues transmitting. When data transmission is completed, the transmit-side terminal A terminates formation of the RF field.

Figure 7:
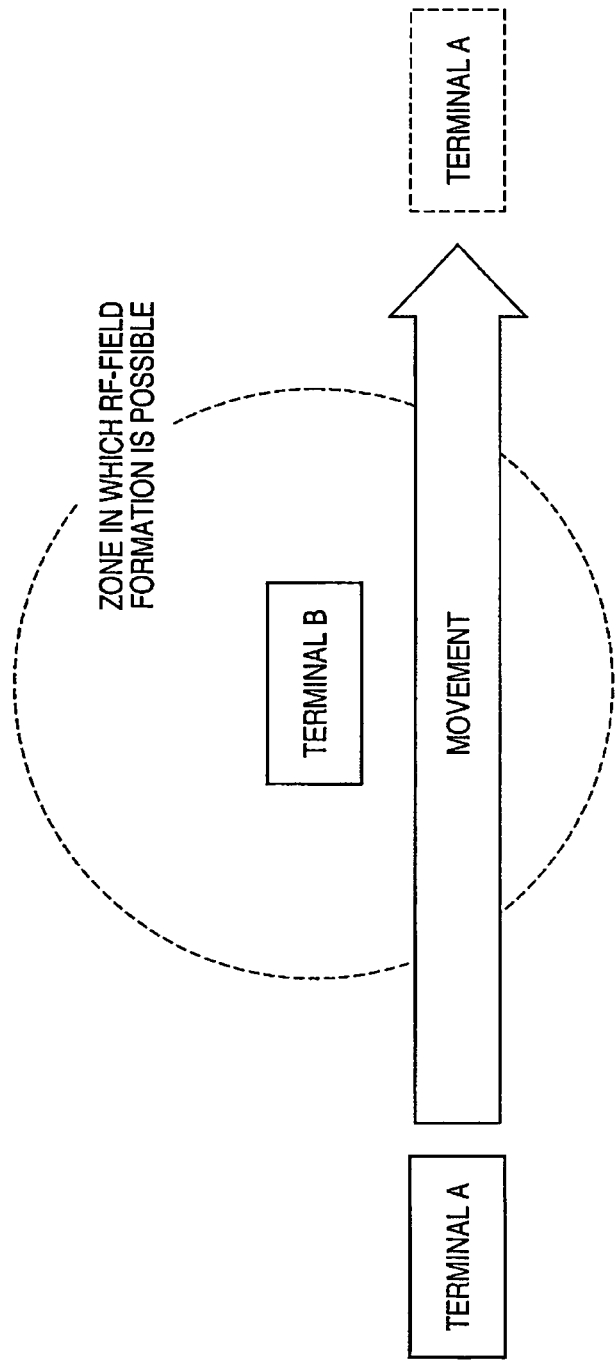
FIG. 7 is a diagram illustrating the circumstances in which the terminal on the transmitting side moves.
Figure 8:
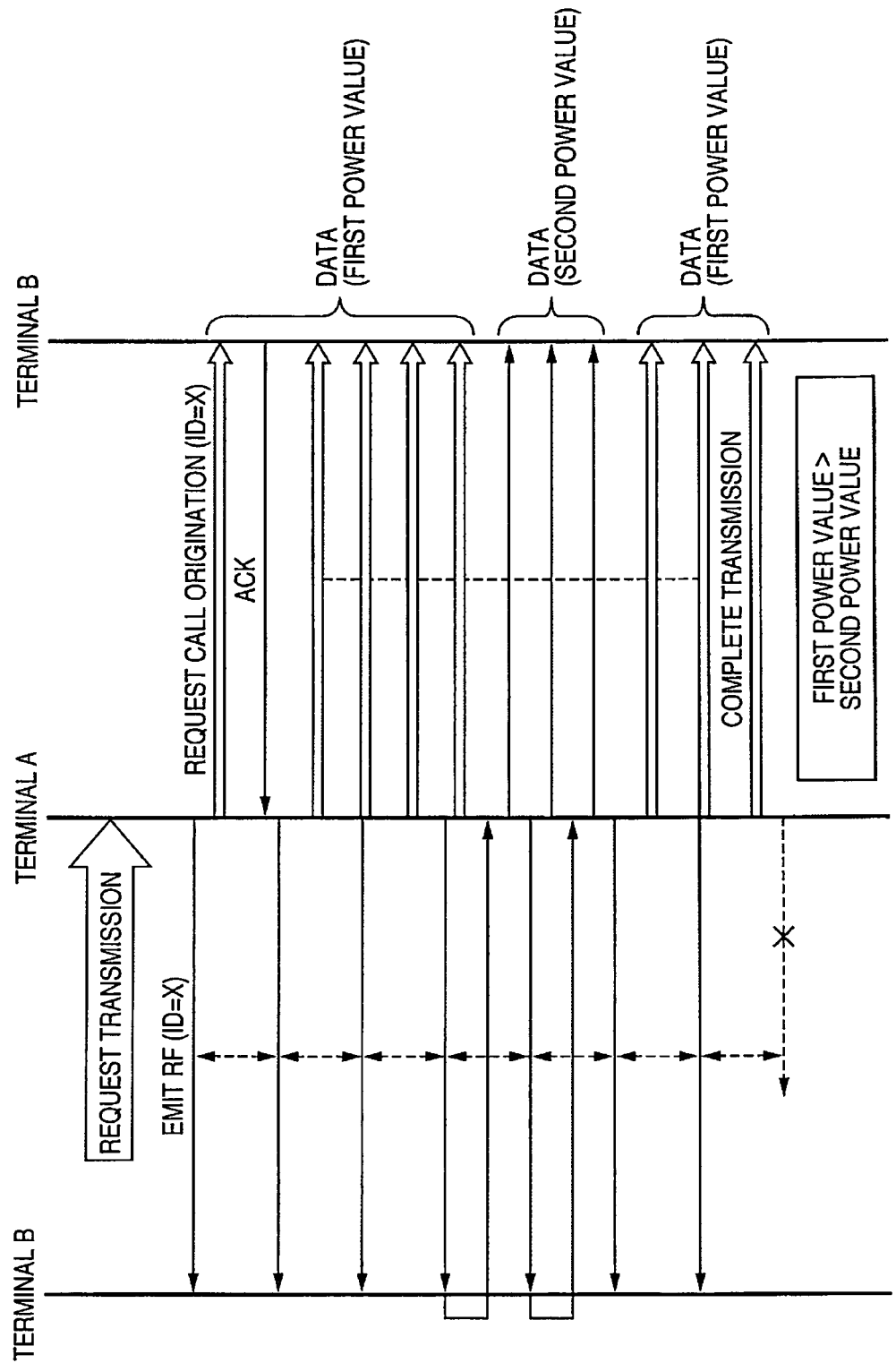
FIG. 8 is a diagram illustrating changes in state in a case where a device has moved from the outside of the zone in which an RF field is capable of being formed to the inside of this zone and then to the outside of this zone after the start of communication.

Described next will be transmission power control in a case where the transmit-side terminal A passes by in the vicinity of the receive-side terminal B. FIG. 7 is a diagram illustrating the circumstances in which the transmit-side terminal A moves, and FIG. 8 illustrates the changes in state in this case. It is assumed that the RF field starts being issued from terminal A, which is the source of transmission.

If a data transmission has been requested, the transmit-side terminal A tries forming an RF field using the ID of the receive-side terminal B, which is the destination of the data transmission. In the initial state, however, the receive-side terminal B is outside the zone in which RF-field formation is possible and therefore an RF field is not formed. As a result, the transmit-side terminal A makes the transmission power value the first power value and starts the transmitting operation.

The transmit-side terminal A thenceforth tries forming an RF field at regular intervals during data transmission. If the receive-side terminal B comes to reside inside the zone in which RF-field formation is possible, an RF field is formed. When the RF field is formed, the transmit-side terminal A changes the transmission power value of the ensuing data from the first power value to the second (lower) power value and continues transmitting.

The transmit-side terminal A thenceforth checks the RF field at regular intervals during data transmission. If during data transmission the receive-side terminal B comes to reside outside the zone in which RF-field formation is possible and the RF field between terminal A and the receive-side terminal B is cut off, the transmit-side terminal A changes the transmission power value of the ensuing data from the second power value to the first power value and continues transmitting. When data transmission is completed, the transmit-side terminal A terminates formation of the RF field.

In the examples illustrated in FIGS. 5 to 8, it is assumed throughout that the RF field is activated from the transmit-side terminal A serving as the source of data transmission. However, the above-described sequence is possible also in a case where the RF field is activated from the receive-side terminal B, which is the destination of reception.

As mentioned above, generally the transmission power value is set assuming that communication distance with a wireless LAN or the like is on the order of several hundred kilobytes per second whereas the distance over which an RF field is capable of being formed by short-distance radio that relies upon contactless electromagnetic coupling is on the order of tens of centimeters. Accordingly, in a case where an RF field is capable of being formed (i.e., a case where the distance to the terminal of the other party is short), communication is possible even if the transmission power value on the side of the wireless LAN is reduced, i.e., even if the power value is changed from the first power value to the second power value.

By thus changing the power value, power consumption on the data transmitting side can be reduced and, in addition, the zone within which communication is possible is restricted. As a result, leakage of information does not readily occur and it is possible to prevent wiretapping, thereby enhancing security.

Second Embodiment

Figure 9:
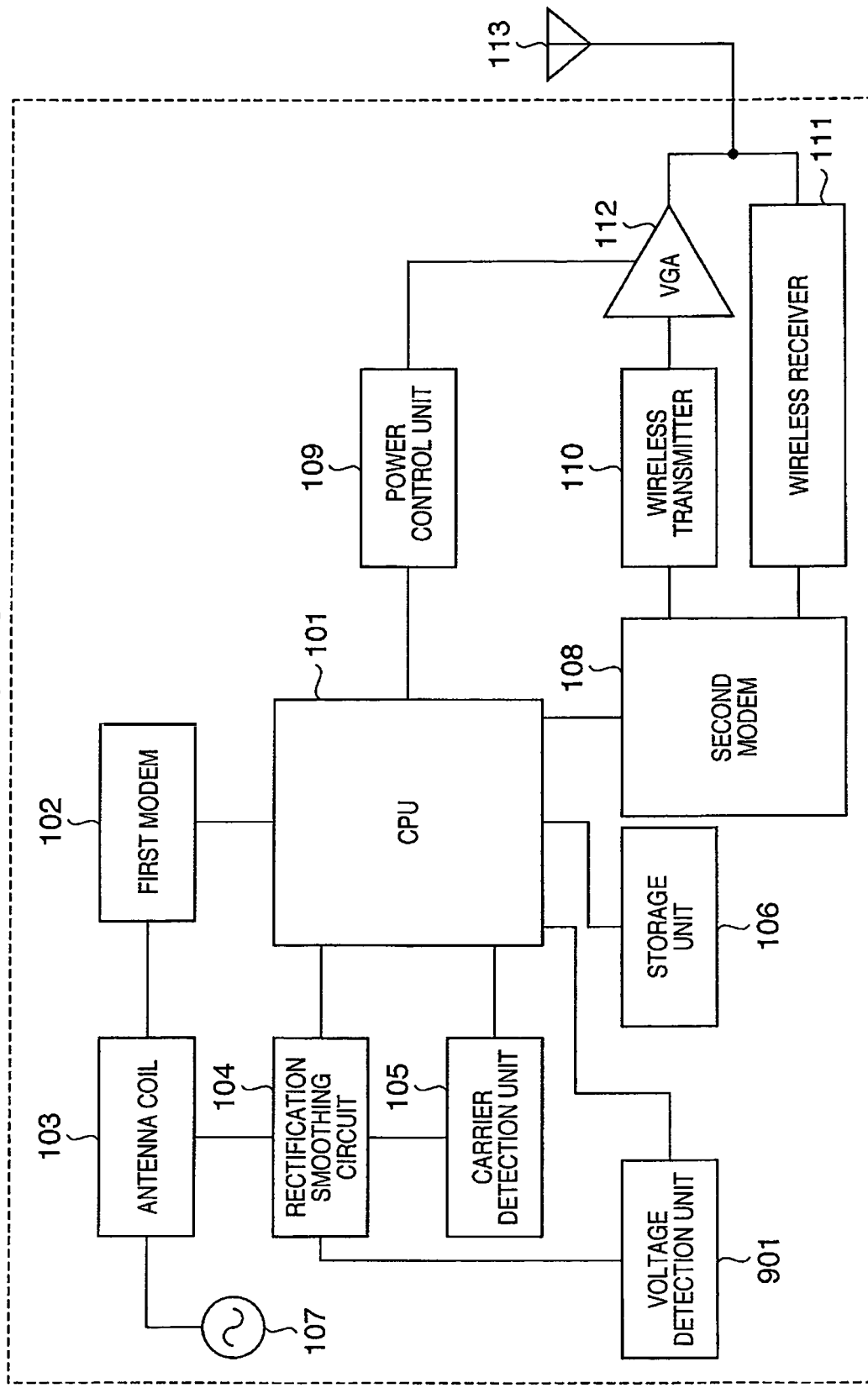
FIG. 9 is a block diagram illustrating the structure of a wireless communication apparatus according to a second embodiment of the present invention.

A second embodiment of the present invention will now be described. FIG. 9 is a block diagram illustrating the structure of a wireless communication apparatus according to the second embodiment. The second embodiment is obtained by additionally providing the structure of the first embodiment with a voltage detection unit 901 that detects the smoothed voltage from the rectification smoothing circuit 104.

In general, the voltage value smoothed by the rectification smoothing circuit 104 varies in accordance with the distance between communicating terminals even inside the zone in which RF-field formation is possible. That is, the detected voltage is higher for smaller spacing between terminals. Such a change in voltage is detected by the voltage detection unit 901 in the second embodiment constructed as set forth above. Accordingly, it is possible to control the transmission power value by controlling the value of the VGA 112 in accordance with the power value detected by the voltage detection unit 901. Other operations performed by this embodiment are similar to those of the first embodiment.

By way of example, assume that voltage values detected by the voltage detection unit 901 are the three voltages V1, V2 and V3 (V1>V2>V3), and assume that transmission power values are the three values P1, P2 and P3 (P1<P2<P3). The transmission power value is set to P1 when the voltage value is V1, to P2 when the voltage value is V2 and to P3 when the voltage value is V3. That is, control is performed in such a manner in that the higher the voltage value detected by the voltage detection unit 901, the lower the transmission power value is set. Such control is carried out mainly by the CPU 101 and power control unit 109.

In accordance with the second embodiment as described, finer control of voltage becomes possible inside the zone in which RF-field formation is possible. This makes possible an even greater reduction in power consumption.

It should be noted that the number of voltage-value control stages is not limited to three; by raising the number of control stages, even finer control of transmission power becomes possible.

Third Embodiment

Figure 10:
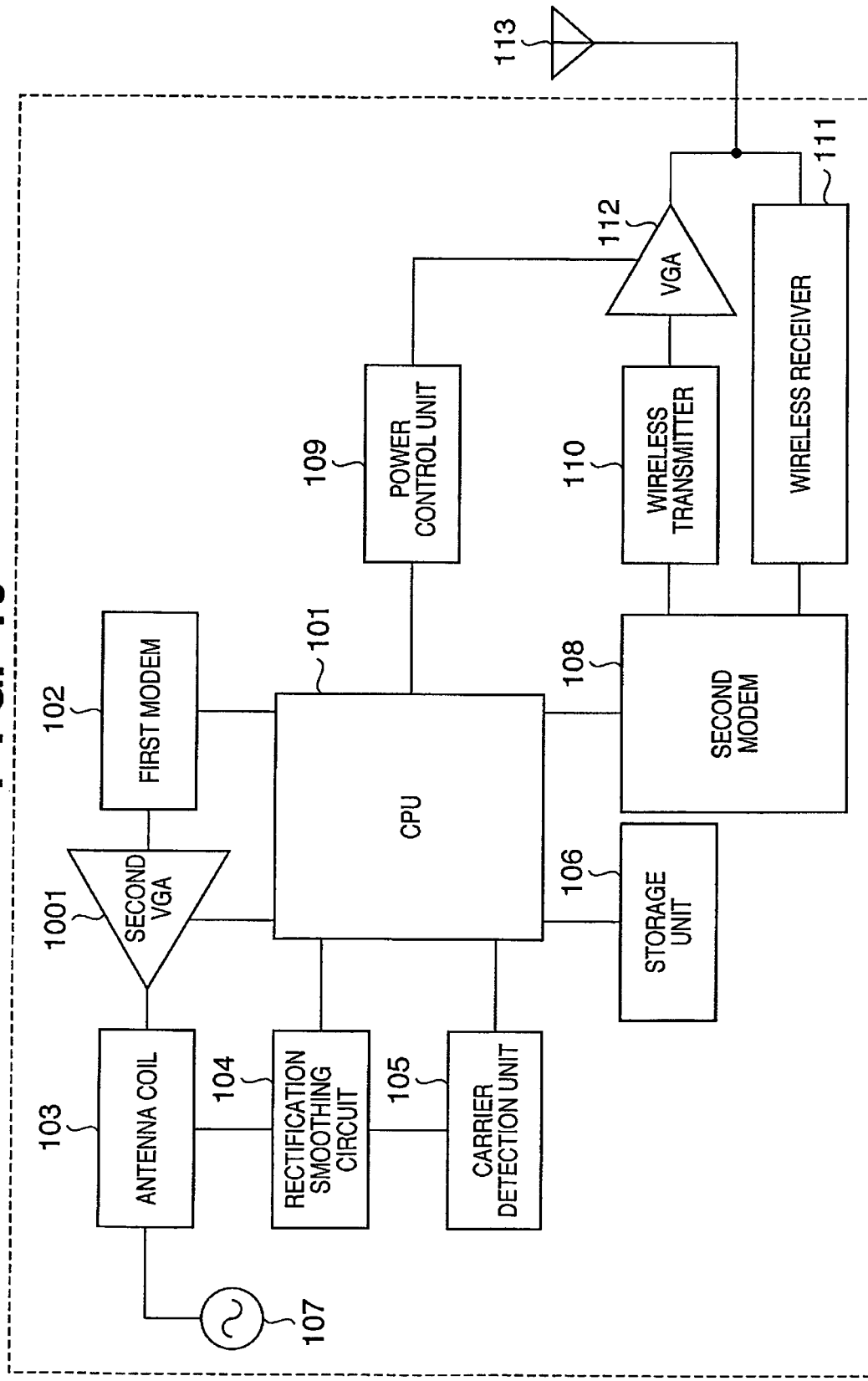
FIG. 10 is a block diagram illustrating the structure of a wireless communication apparatus according to a third embodiment of the present invention.

A third embodiment of the present invention will now be described. FIG. 10 is a block diagram illustrating the structure of a wireless communication apparatus according to the third embodiment. The third embodiment is obtained by additionally providing the structure of the first embodiment with a second variable-gain amplifier (VGA) 1001 for increasing or decreasing the strength of the electric field emitted by the antenna coil 103.

In the third embodiment thus constructed, the higher the amplification factor of the variable-gain amplifier 1001 is made, the broader the zone in which RF-field formation is possible becomes. Accordingly, it can be determined that the higher the amplification factor of the variable-gain amplifier 1001, the greater the distance between terminals, and that the lower the amplification factor of the variable-gain amplifier 1001, the smaller the distance between terminals.

Figure 11:
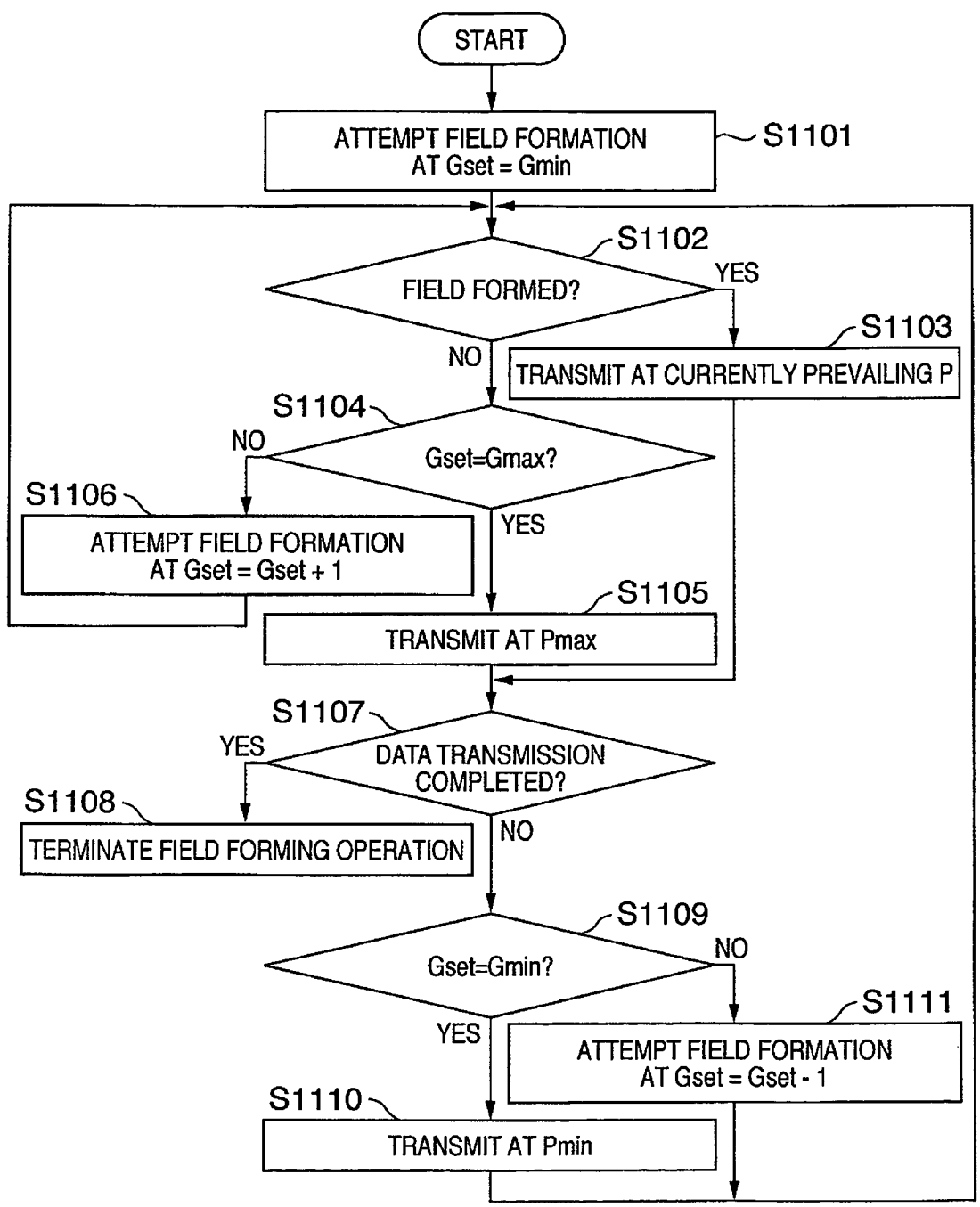
FIG. 11 is a flowchart illustrating the operation of the third embodiment.

Described next will be the operation of the wireless communication of the third embodiment having these properties. FIG. 11 is a flowchart illustrating the embodiment of the third embodiment. Operation will be described assuming that the terminal is that on the transmitting side.

First, the gain (referred to as "$G_{set}$" below) of the second variable-gain amplifier 1001 is set to a minimum value $G_{min}$, formation of an RF field is attempted (step S1101) and it is determined whether the RF field could be formed (step S1102).

If the RF field could be formed ("YES" at step S1102), then the transmission power value corresponding to the set value $G_{set}$ of the variable-gain amplifier 1001, which is the currently prevailing set value, is set in the VGA 112 and the data transmitting operation is started (step S1103).

On the other hand, if the RF field could not be formed ("NO" at step S1102), then it is determined whether the set value $G_{set}$ is a maximum value $G_{max}$ (step S1104). If the set value is not the maximum value $G_{max}$ ("NO" at step S1104), then the set value $G_{set}$ is raised one level (i.e., is made $G_{set}+1$) (step S1106) Formation of an RF field is then re-attempted (step S1102).

If the result of the determination is that the set value $G_{set}$ is the maximum value $G_{max}$ ("YES" at step S1104), the transmission power value of the VGA 112 is set to the maximum value $P_{max}$ and the transmitting operation is started (step S1105).

Next, after the above-described transmission (step S1103 or S1105), it is determined whether the data transmission has been completed (step S1107). If data transmission has been completed ("YES" at step S1107), then the operation for forming an RF field is terminated (step S1108).

On the other hand, if the data transmission has not ended i.e., if the data that has been transmitted is not the final data ("NO" at step S1107), then it is determined whether the set value $G_{set}$ is the minimum value $G_{min}$ (step S1109). If the set value is not the minimum value $G_{min}$, then the set value $G_{set}$ is lowered one level (i.e., is made $G_{set}-1$) and formation of an RF field is attempted (step S1111).

If the result of the determination is that the set value $G_{set}$ is the minimum value $G_{min}$ ("YES" at step S1109), the transmission power value of the VGA 112 is set to the minimum value $P_{min}$ and the transmitting operation is continued (step S1110).

Thus, according to the third embodiment, the transmission power value of the VGA 112 is controlled in accordance with the set value set as the gain of the second VGA 1001.

By way of example, assume that gains of the second VGA 1001 are three gains g1, g2 and g3 (g1>g2>g3), and assume that transmission power values are the three values P4, P5 and P6 (P4<P5<P6). The transmission power value is set to P6 when the gain is g1, to P5 when the gain is g2 and to P4 when the gain is g3. That is, the higher the gain of the second VGA 1001, the higher the transmission power value is set.

More specifically, at the time of RF-field formation, the gain of the second VGA 1001 is raised in the order g3, g2, g1 in accordance with the flowchart shown in FIG. 11. Data transmission is started using a power value P of transmission power corresponding to the gain of the second VGA 1001 when an RF field could be formed.

After formation of the RF field, the RF field is checked at regular intervals and at this time the gain of the second VGA 1001 is lowered by one level relative to the previous gain and an attempt is made to form an RF field. If an RF field is capable of being formed even at this gain, then the transmission power is changed to a transmission value P corresponding to the gain prevailing after the gain has been lowered by one level, and the transmitting operation is continued. For example, if the gain of the VGA 1001 that prevailed at the previous formation of the RF field was g2, then the gain of the VGA 1001 at the present time is made g3 and an attempt is made to form an RF field. As long as an RF field is capable of being formed, this operation is attempted until the gain of the VGA 1001 is minimized.

On the other hand, if an RF field cannot be formed after the gain of the VGA 1001 has been lowered by one level relative to the previous gain, then the gain of the VGA 1001 is restored to a value that is the same as the previous value and an attempt is made to form the RF field.

Further, after the RF field is formed, the RF field is checked at regular intervals. Cut-off of the RF field may also be detected at such time. In such case the gain of the VGA 1001 is raised by one level relative to the previous gain and an attempt is made to form the RF field. If the RF field is capable of being formed, then the transmission power is changed to a power value P that corresponds to the gain that prevails after the gain has been raised by one level, and the transmitting operation is continued. For example, if the gain of the VGA 1001 that prevailed at the previous formation of the RF field was g2, then the gain of the VGA 1001 at the present time is made g1 and an attempt is made to form an RF field. As long as an RF field is not capable of being formed, this operation is attempted until the gain of the VGA 1001 is maximized.

This control is carried out mainly by the CPU 101 and power control unit 109.

As in the second embodiment, the number of voltage-value control stages is not limited to three; by raising the number of control stages, even finer control of transmission power becomes possible.

The embodiments of the present invention can be implemented by having a computer program execute a program, by way of example. Means for supplying the program to a computer also can be applied as the embodiments of the invention. Examples of such means are a computer-readable recording medium such as a CD-ROM on which the program has been recorded, and a transmission medium such as the Internet for transmitting the program. Further, the program also can be applied as the embodiments of the invention. The program, recording medium, transmission medium and program product all fall within the scope of the present invention.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-336385 filed Nov. 19, 2004, which is hereby incorporated by reference herein.

What is claimed is:

1. A wireless communication apparatus, comprising:
a first communication unit configured to communicate by a first communication method;
a second communication unit configured to communicate by a second communication method different from the first communication method, wherein the second communication method uses electromagnetic coupling; and
a determination unit configured to determine, when the first communication unit communicates with another wireless communication apparatus, whether or not said another wireless communication apparatus is present inside a communication area of the second communication unit using at least the second communication unit;
wherein the first communication unit communicates with said another wireless communication apparatus by first transmission power in a case where it is determined by the determination unit that said another wireless communication apparatus is present inside the communication area of the second communication unit, and communicates with said another wireless communication apparatus by second transmission power larger than the first transmission power in a case where it is determined by the determination unit that said another wireless communication apparatus is not present inside the communication area of the second communication unit.

2. The apparatus according to claim 1, wherein determination unit determines whether or not said another wireless communication apparatus is present inside the communication area of the second communication unit intermittently.

3. The apparatus according to claim 1, further comprising a confirmation unit configured to confirm identification information of said another communication apparatus acquired by the second communication unit,
wherein the determination unit determines whether or not said another wireless communication apparatus is present inside the communication area of the second communication unit based on a result of confirmation by the confirmation unit.

4. The apparatus according to claim 1, wherein the communication area of the second communication unit is an area in which a radio-frequency electromagnetic coupling field can be formed by the second communication unit.

5. The apparatus according to claim 4, further comprising:
a measuring unit configured to measure reception intensity of the radio-frequency electromagnetic coupling field; and
a power change unit configured to change the transmission power of the first communication unit in accordance with a result of measurement by the measuring unit in a case where said another wireless communication apparatus is present inside the radio-frequency electromagnetic coupling field.

6. The apparatus according to claim 5, wherein the higher the reception intensity, the lower the value of the first transmission power is made by the power change unit.

7. The apparatus according to claim 5, wherein
the second communication unit communicates directly with said another wireless communication apparatus by the radio-frequency electromagnetic coupling field, further comprising
a voltage changing unit configured to change the transmission power of the direct communication by the second communication unit;
wherein the power change unit changes the transmission power of the first communication unit in accordance with the value of the transmission power of the second communication unit in a case where said another wireless communication apparatus is present inside the radio-frequency electromagnetic coupling field.

8. The apparatus according to claim 7, wherein the higher the value of the transmission power of the second communication unit, the higher the value of the transmission power of the first communication unit is made by the power change unit.

9. The apparatus according to claim 7, wherein the voltage changing unit changes the transmission power of the second communication unit to a lower and lower values as long as the second communication unit directly communicates with said another wireless communication apparatus by the radio-frequency electromagnetic coupling field.

10. The apparatus according to claim 7, wherein the second wireless communication unit forms the radio-frequency electromagnetic coupling field intermittently, and the voltage changing unit lowers the value of transmission power relative to what it was at the time of previous radio-frequency electromagnetic coupling field formation whenever the direct communication by the second communication unit is possible in a radio-frequency electromagnetic coupling field.

11. A communication system comprising: the communication apparatus set forth in claim 1; and
a second communication apparatus having a transmission unit configured to transmit identification information of the second communication apparatus to the communication apparatus using the direct communication by the second communication method.

12. The apparatus according to claim 1,
wherein the determination unit determines whether or not said another wireless communication apparatus is present inside the communication area of the second communication unit based on a response of said another wireless communication apparatus to a signal transmitted by using the second communication unit.

13. The apparatus according to claim 1, wherein the determination unit determines whether or not said another wireless communication apparatus is present inside the second communication area at regular time at regular time intervals.

14. A method of controlling a wireless communication apparatus comprising a first communication unit configured to communicate by a first communication method and a second communication unit configured to communicate by a second communication method, the method comprising:
determining, when the first communication unit communicates with another wireless communication apparatus, whether or not said another wireless communication apparatus is present inside a communication area of the second communication unit using at least the second communication unit; and
controlling the first communication unit to communicate with said another wireless communication apparatus by first transmission power in a case where it is determined in the determining step that said another wireless communication apparatus is present inside the communication area of the second communication unit and to communicate with said another wireless communication apparatus by second transmission power larger than the first transmission power in a case where it is determined in the determining step that said another wireless communication apparatus is not present inside the communication area of the second communication unit,
wherein the second communication method is different from the first communication method and wherein the second communication method uses electromagnetic coupling.

15. A non-transitory computer-readable medium storing thereon a computer program for causing a computer to execute a method of controlling a wireless communication apparatus comprising a first communication unit configured to communicate by a first communication method and a second communication unit configured to communicate by a second communication method, the method comprising:
determining, when the first communication unit communicates with another wireless communication apparatus, whether or not said another wireless communication apparatus is present inside a communication area of the second communication unit using at least the second communication unit; and
controlling the first communication unit to communicate with said another wireless communication apparatus by first transmission power in a case where it is determined in the determining step that said another wireless communication apparatus is present inside the communication area of the second communication unit and to communicate with said another wireless communication apparatus by second transmission power larger than the first transmission power in a case where it is determined in the determining step that said another wireless communication apparatus is not present inside the communication area of the second communication unit,
wherein the second communication method is different from the first communication method and wherein the second communication method uses electromagnetic coupling.

* * * * *